May 3, 1960  J. A. MacDONALD  2,935,235
DEVICE FOR DISTRIBUTING GRANULAR MATERIAL
Filed Dec. 18, 1957  4 Sheets-Sheet 1

Inventor
JAMES A. MacDONALD by:
Attorney

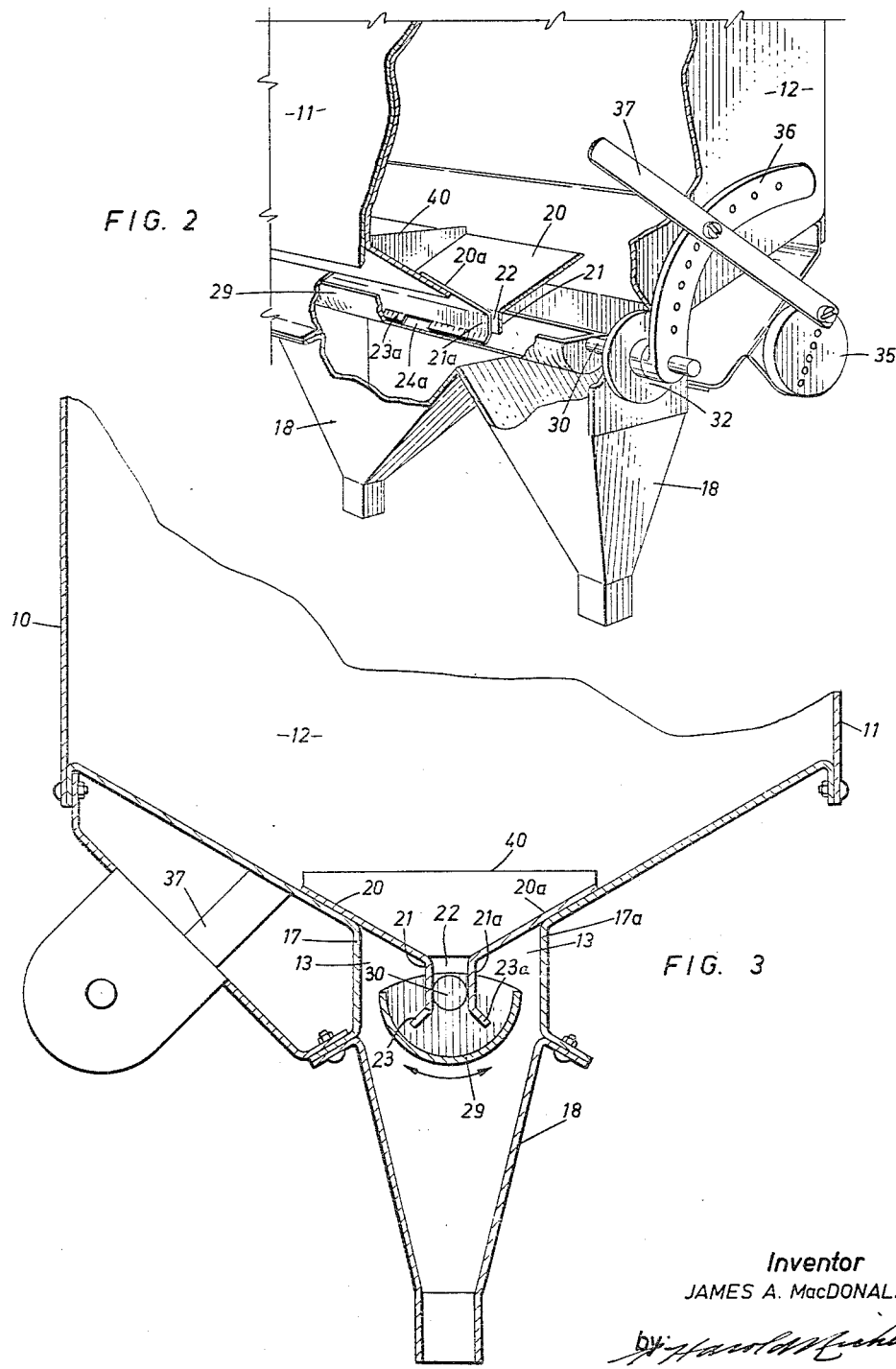

May 3, 1960     J. A. MacDONALD     2,935,235
DEVICE FOR DISTRIBUTING GRANULAR MATERIAL

Filed Dec. 18, 1957     4 Sheets-Sheet 3

Inventor
JAMES A. MacDONALD

May 3, 1960 J. A. MacDONALD 2,935,235
DEVICE FOR DISTRIBUTING GRANULAR MATERIAL
Filed Dec. 18, 1957 4 Sheets-Sheet 4
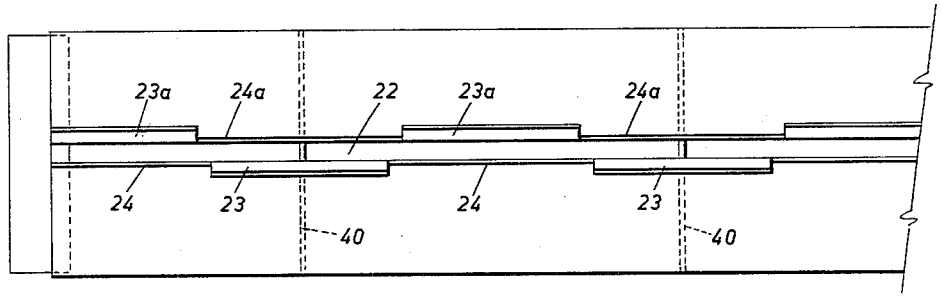
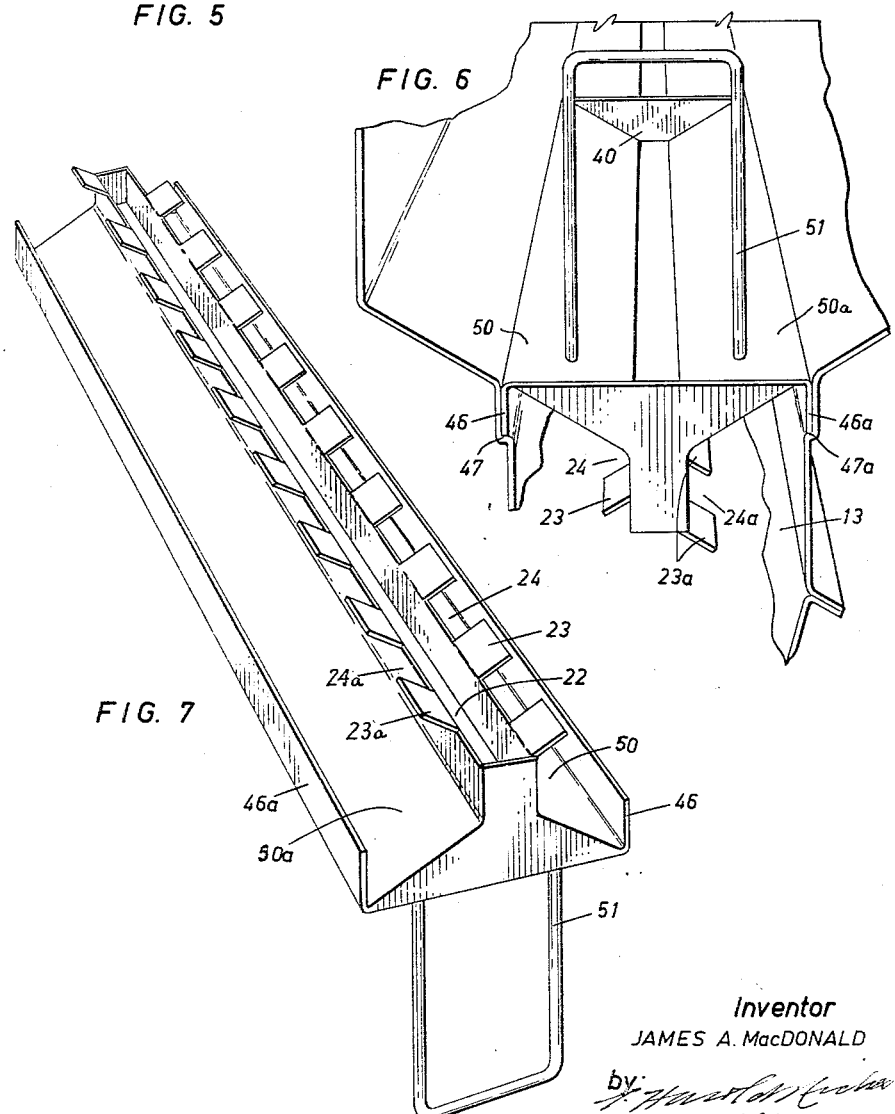
Inventor
JAMES A. MacDONALD United States Patent Office 2,935,235
Patented May 3, 1960

2,935,235

DEVICE FOR DISTRIBUTING GRANULAR MATERIAL

James Anthony MacDonald, Calgary, Alberta, Canada, assignor to The Consolidated Mining and Smelting Company of Canada Limited, Montreal, Quebec, Canada, a company of Canada Application December 18, 1957, Serial No. 703,610

8 Claims. (Cl. 222—199)

This invention relates to a device for distributing granular material. It is particularly directed to providing an improved device for distributing chemical fertilizer in granular form to the soil.

Devices for distributing chemical fertilizer in granular form are in widespread use. These devices, usually, are designed to distribute the fertilizer over the soil or to apply it to the soil in a predetermined pattern either concurrently with or separately from the seeds or plants with which the fertilizer is to be used. The main element of most fertilizer distribution devices is a horizontally elongated bin or box either carried by an axle on which are mounted the ground wheels by which the device travels or supported by being fastened to a grain drill or other wheeled farm implement. The hopper-shaped, that is, slope-sided, base of the bin usually is open at the bottom for most of its length, or it is provided with a series of outlet openings which communicate with spouts through which the fertilizer is distributed to the soil. Various means are used to agitate the fertilizer and facilitate its flow from the bin through the outlet or outlets, for example, a rotor which consists of a series of suitably spaced agitator wheels mounted on a transverse shaft which extends lengthwise of the bin and which may be driven from the axle on which the ground wheels are mounted, a belt feeder, or a series of suitably spaced horizontal star-shaped wheels individually driven by an appropriate mechanism.

Objectionable features in the design and operation of available fertilizer distributing devices are the overall weight of the device; the difficulty of obtaining a free flow of a desired amount of fertilizer without crushing the granules and thus forming fines which are carried away by the wind; corrosion of the parts of the device in contact with the fertilizer; and the difficulty of cleaning the device after use. One problem commonly encountered in the use of known fertilizer distributors results from the tendency of crystals or granules of chemical fertilizer to agglomerate and cake in storage. Such agglomeration or caking may interfere with the free flow of fertilizer to the outlet or outlets and, also, may jam the rotor or other agitating means so that operation is disrupted for minor repairs or even to such extent that breakage may be caused in the driving mechanism.

The primary object of the present invention is to provide a novel device for distributing granular materials, particularly chemical fertilizer in granular form, which permits simple, positive regulation of feed rate. In this new device there are relatively few moving parts and no gears, with the result that power requirements, maintenance requirements and over-all weight are relatively low. There is no appreciable variation in the feed rate caused by tilting of the device in the field in passing from level to sloping land. There is no danger of jamming or seizing of moving parts. Ease of emptying and cleaning after use is a further advantage. The device can be used as a universal attachment for grain drills and can be converted easily to a full width broadcaster. Use of the device is not restricted to the distribution of fertilizer, of course, but may also include the broadcasting of such materials as sand and gravel. The device may, in addition, be adapted to the sowing of seed.

The important advantages of the distributor of this invention are attained in part by providing, below the hopper-shaped bottom of the bin, an oscillatable, trough-shaped member, which forms a closure member for the bottom of the bin. This trough-shaped member extends longitudinally of the bin and is oscillated, for example, by means of a chain or belt drive from the axle of the grain drill with which the device is normally used, through a countershaft and crank arrangement.

A further important part of the overall assembly is a removable baffle component with an open feed throat through which fertilizer flows from the bin. This removable baffle is fitted into the hopper-shaped base of the bin. The open feed throat which extends below the bottom of the bin and terminates above the oscillatable trough-shaped member is defined by end walls and by side walls which form opposed scraper members by means of which, through the oscillating action of the trough-shaped member, a predetermined amount of fertilizer is scraped alternately over first one side, then the other side, of the trough-shaped member during its oscillations. Preferably, each scraper member is designed so that its lower edge is in the form of a series of outwardly flared projections, each projection being separated from its next adjacent projection by a slot and each flared projection of one scraper member being opposite to a slot in the opposing scraper member.

A preferred embodiment of the invention is described in detail hereinafter, reference being made to the accompanying drawings in which:

Figure 2 is a fragmentary rear view, in perspective and partly in section, of the assembly.

Figure 3 is an end view in section.

Figure 5 is a bottom plan view of the baffle component showing the relative positions of the flared projections and the slots.

Figure 6 is a fragmentary top plan view, in perspective, of a modification of the baffle component; and Figure 7 is a bottom plan view, in perspective, of the modification illustrated in Figure 6.

Like reference characters refer to like parts throughout the description and drawings.

Figure 1:
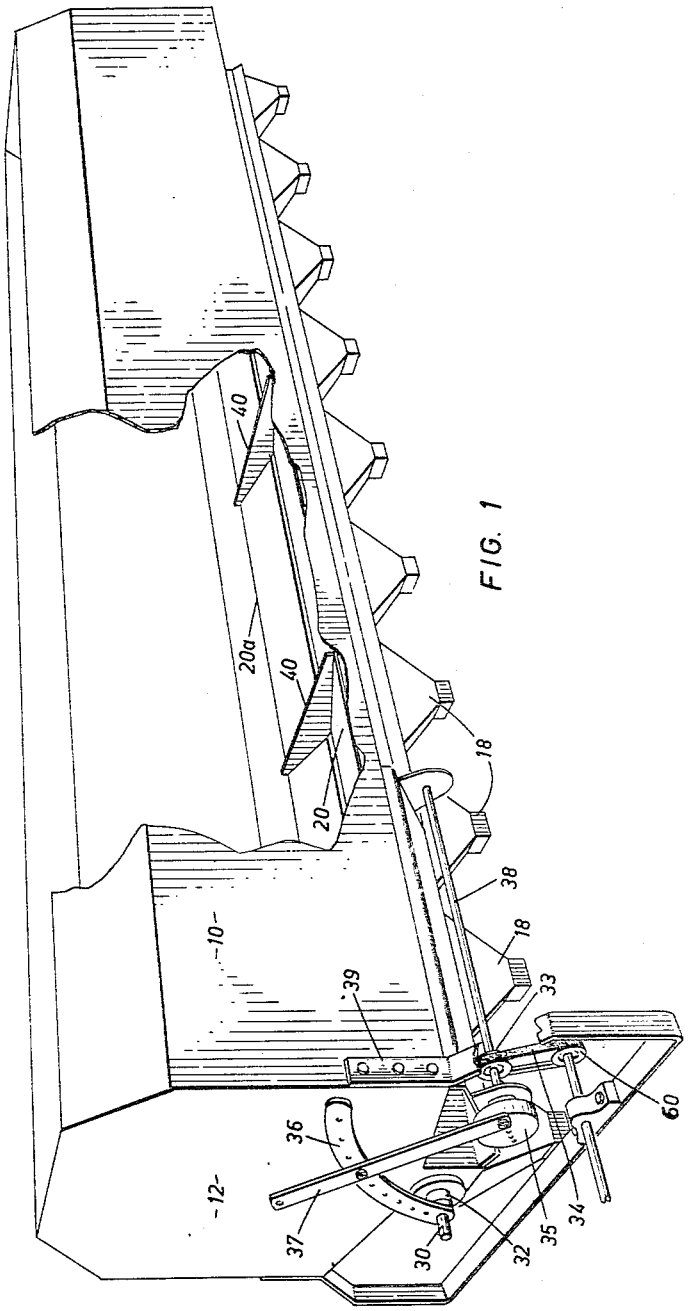
Figure 1 is a fragmentary front view, in perspective, and partly in section, of a fertilizer distributor which embodies the improvements of the present invention.

The distributor comprises an elongated receptacle or bin which is formed with front and rear walls 10 and 11 respectively and end walls 12. The hopper-shaped base terminates in an outlet 13 which extends the length thereof. The outlet 13 is defined by end walls and by downwardly extending side walls 17 and 17a. The upper ends of a plurality of downwardly extending spaced spouts 18 are secured, preferably detachably, to the lower ends of the walls 17 and 17a. The bin is carried in a conventional manner, not shown, either on its own ground wheels or attached to a grain drill, or by other conventional means.

A baffle component comprises angularly disposed plates 20 and 20a, which are removably fitted to and mate with the sloping bottom of the base of the bin. The lower ends of the plates 20 and 20a extend toward but stop short of each other and then extend downwardly into the outlet 13 to form the walls 21 and 21a of the throat 22. Preferably the lower ends of the walls 21 and 21a terminate in uniformly spaced, outwardly flared rectangular projections 23—23a separated by slots 24—24a cut out of the metal in such fashion that the center of a rectangular projection of one wall is directly opposite the center of a slot of the other wall.

An oscillatable, trough-shaped member 29 is provided in the outlet 13 below the outlet end of the throat 22. A short shaft 30 is provided at each of the ends of the trough-shaped member and is journalled in a bearing member 32 mounted at each end of the bin. Only one shaft 30 and one bearing member 32 are shown. The axis of the trough member 29 and the axes of the shafts 30 are in alignment and form the axis about which the whole of the trough-shaped member oscillates. This member 29, which will be referred to hereafter as the trough, can be oscillated by a motor if desired. However, it usually is more convenient and less costly to drive it from the grain drill with which normally the fertilizer distributor will be used. A sheave 33 is mounted on a short countershaft 38 carried by a bracket section 39 fastened outside at one end of the bin to one of the sloping sides of the hopper-shaped bottom. A driving belt 34 extends from the sheave 33 to an aligned sheave 60 which is connected to a conventional driving means, for example, the axle of a grain drill. A crank disk 35 is mounted on the end of the countershaft 38. A quadrant 36 is mounted on the shaft 30 in alignment with the crank disk 35. One end of a connecting rod 37 is adjustably secured to the crank disk 35 and the rod is also adjustably secured to the quadrant 36.

The baffle component is divided, along its length, by vertically disposed stiffening elements or webs 40 which are welded, or otherwise secured, at their lower edges to the angularly disposed plates 20 and 20a. These stiffening elements serve the dual purpose of forming the baffle component into a strong, rigid integral unit and of dividing the component into compartments which may, if desired, correspond in number to the number of spout members 18. The throat 22 of the baffle component is confined to that portion between the two end stiffening webs which are directly above the two ends of the trough 29 where the shafts 30 are joined thereto. The end sections of the baffle component between the two end stiffening webs and the adjacent ends of the bin are not open at the center portion in line with the throat 22 but form excluding seals above those portions of the shafts within the bin.

The baffle component can be removably secured to the bottom of the bin, for example, by bolting, if desired. It is preferable, however, that it be designed to fit snugly into the bottom of the bin without fastening and thus be easily removable for cleaning purposes. Also, of course, the baffle component is readily accessible for repair and replacement if necessary. Provision can be made for lifting the baffle component into and out of the bin, such as handles 51 one of which is shown in Figures 6 and 7. With the baffle component removed from the bin, the trough can be turned upside down and thus clear the trough and the bin completely of fertilizer granules. Fertilizer dust particles can be readily washed off the surfaces of the baffle component, trough and bin. As chemical fertilizer is corrosive, provision for thorough cleaning to prevent corrosion of metal parts, particularly during storage, is important.

A further advantage, due to the above noted details of design, accrues from the fact that there are no bearings working in fertilizer and therefore any moisture on them does not get into the fertilizer. Moisture will cause caking or agglomeration of the fertilizer and impairs the distribution. Furthermore, the bin can be used with a waterproof cover, thus making possible operation during rainy weather.

The operation of the device is very simple. The bin is charged with granular fertilizer. If the device is to be moved to a point of distribution, the drive belt 34 can be disengaged and the trough 29 serves as an effective closure member until the point of distribution is reached. The belt can then be engaged with the sheaves 30—50 mounted on the countershaft 38 and on the axle of the grain drill or other conventional means and, as the device is moved over the ground, the trough 29 is oscillated. As it oscillates, an amount of fertilizer is pushed alternately over each side of the trough. The motion of the trough 29 in one direction of its oscillation path, as shown by the arrow in Figure 3, pushes fertilizer against the scraper member which is farther in the direction of motion of the trough, e.g., scraper member projection 23. The opposing space slots 24a permit a piling up of fertilizer behind them and as the trough 29 continues its motion in the one direction the piling up is sufficient that fertilizer is caused to flow over the trailing edge of the trough.

Although the scraper members are not actually moving parts, in effect, during each oscillation of the trough, each flared projection of the scraper members pushes through the opposing space slot fertilizer in amount sufficient that fertilizer is forced to flow over the trailing trough edge. This action causes agitation in the flared section and helps to maintain continuous gravity flow of fertilizer through the throat 22 from the bin. The scraper members also serve to restrict the rate of flow to that desired. The extent of each oscillation and the amount of fertilizer discharged can be regulated conveniently by the arrangement of the crank, connecting rod and quadrant assembly.

In the design of a fertilizer distributor, which incorporates the improvements of the present invention, convenient dimensions of height and length of the throat 22 are used. Choice of the width dimension of the throat is very important, however. The throat member should be as narrow as possible consistent with the unimpeded flow of fertilizer. The diameter of the trough member must be increased as the width of the throat member is increased in order to accommodate the increased flow of fertilizer. For the usual granular fertilizers, a throat width of about 5/16 inch has been found to be satisfactory.

The cross-section of trough 29 preferably includes that arc of a circle equivalent to at least a semi-circle. The cross-section of trough illustrated includes a semi-circle about 1½ inches in diameter and side extensions of about 1/8 inch tangential to the diameter. These extensions result in improved positive action by the scrapers as the fertilizer is then forced over the sides of the trough rather than being allowed to flow freely by gravity. The centre of oscillation of the trough 29 should coincide with the axis of the circle which contains the trough arc to ensure uniform distance at all times between the scraper members and the trough. The clearance between the lower ends of the scrapers and the trough should be as small as possible with a minimum of grinding, as the rate of discharge of fertilizer is reduced with increase of the clearance between the scrapers and the trough. A clearance of about 3/16 inch produces satisfactory results. Grinding of fertilizer between the lower ends of the scrapers and the bottom of the trough is objectionable because of undue power loss during operation and, also, because finely ground fertilizer tends to accumulate in the trough and to cling to the surfaces of the trough and the distributor spouts.

A preferred rate of oscillation of the trough is about 300 complete cycles per minute with a forward speed in the field of about 4½ miles per hour. The feed rate can be varied by changing the rate of oscillation and the angle of oscillation. It is preferred to maintain the rate of oscillation relatively constant and to regulate the discharge rate by adjustment of the angle of oscillation. The angle of oscillation as used herein refers to the angle subtended at the centre of oscillation by the path of any one point on the semi-circular arc of the trough as the trough moves through half an oscillation. The angle of oscillation, which may be adjusted readily by changing the points at which the connecting rod 37 is adjustably connected to the crank disk 35 and the quadrant 36, is set at the value necessary for the desired, predetermined amount of fertilizer to be discharged during each oscillation. It should be recognized that there is a maximum angle of oscillation for proper operation. This maximum angle depends on the angle of repose of the fertilizer being handled and will vary to some extent for the different fertilizers and possibly even for different sized granules of the same fertilizer. Free flow of the fertilizer should be avoided, and to prevent free flow from occurring, the line of the angle of repose from the top of the slots must intersect the trough at all times during oscillation.

The scraper members are important elements in the operation of the device. Preferably, the lower end of each scraper member is flared outwardly to form projections, e.g., 23 and 23a and slots, e.g., 24 and 24a as illustrated in Figures 3, 5, 6 and 7. The preferred angle of flare is such that the angled projections are in line with the axis of oscillation. The projections are shown in the drawings as having been bent through an angle of about 45 degrees. The rate of discharge of fertilizer over the edges of the trough made possible by the rate of oscillation of the trough and the motion of the trough forcing fertilizer against the scraper members with their slotted and flared design is such that the force of gravity on the fertilizer has little effect on the discharge rate. The granules flow into the throat by gravity to fill a space left by the fertilizer being drawn off by means of the positive action of the distributor. A further advantage of the design is that the slots permit the discharge of larger pellets or granules and reduce grinding action by the scraper members on the fertilizer.

The slots and outwardly flared projections of the scraper members are not essential to the operation of the device of the present invention but are important for the best operation to be achieved. When the device is operated as described above, but with vertical, unslotted scrapers or even unslotted scrapers with flared lower ends, the rate of fertilizer discharge over the trough edges is very much lower than with the flared and slotted design. Furthermore, the rate of fertilizer discharge is significantly affected by the head of fertilizer in the bin as it is also by misalignment of the throat and trough. Minor misalignment of the throat and trough has little effect on operation when the baffle component with slotted scrapers and outwardly flared projections is used. Use of the unslotted design of scraper limits the size of granules or other particles discharged to the clearance between the scrapers and the trough and also results in excessive grinding action on the fertilizer.

The fertilizer distributor of the present invention possesses a number of important advantages. Its relatively few moving parts result in lower overall weight, less maintenance through breakage and lower power requirements. While foreign matter such as nails, stones and paper may enter the bin, such materials are discharged from the trough if they are small enough or remain in the trough without jamming or hindering its oscillation if they are too large. The rate of discharge can be easily regulated and it is substantially uniform for any one setting regardless of the weight of the fertilizer in the bin or the slope of the ground over which the device is moved. The device can be adjusted readily for a desired rate of distribution and for the type of fertilizer being distributed. For example, in operation, the rate of discharge was varied to distribute at separate times 50 pounds of ammonium phosphate, 80 pounds of ammonium phosphate-ammonium sulphate and 100 pounds of ammonium nitrate granules per acre at an oscillating rate of 300 complete cycles per minute by merely adjusting the connecting rod to provide oscillating angles respectively of 13°, 16° and 14°. These rates were obtained with a forward speed of 4½ miles per hour using a trough member 1¼ inches inside diameter by 54¼ inches long. The throat width was 5/16 inch, the clearance between projections and trough was 3/16 inch, and the clearance between the top of the slots and the trough was 7/16 inch. The projections were flared outwardly at an angle of 45° and were 2¾ inches wide; the slots were 3¼ inches wide.

The device can be cleaned easily and can be used separately or as an attachment for grain drills and can be converted easily to a full width broadcaster by removal of the detachable spouts 18.

Various modifications in the design of the device of the present invention can be made while retaining the essential combination of an oscillating trough and fixed scraper members. For example, in one modification there is no separate removable baffle component. In this modification, the two sloped sides of the bin bottom are extended to approach each other to the extent that the width of their separation is equivalent to the width of the open feed throat of the removable baffle component described above and are then angled to form the side walls of a similar vertical open feed throat, the terminations of which side walls are in the form of outwardly flared projections alternating with slots, as indicated for the scraper members of the removable baffle component described above. This modification lacks the advantage of simplified cleaning provided by the preferred embodiment, which includes the removable baffle component.

Figure 4:
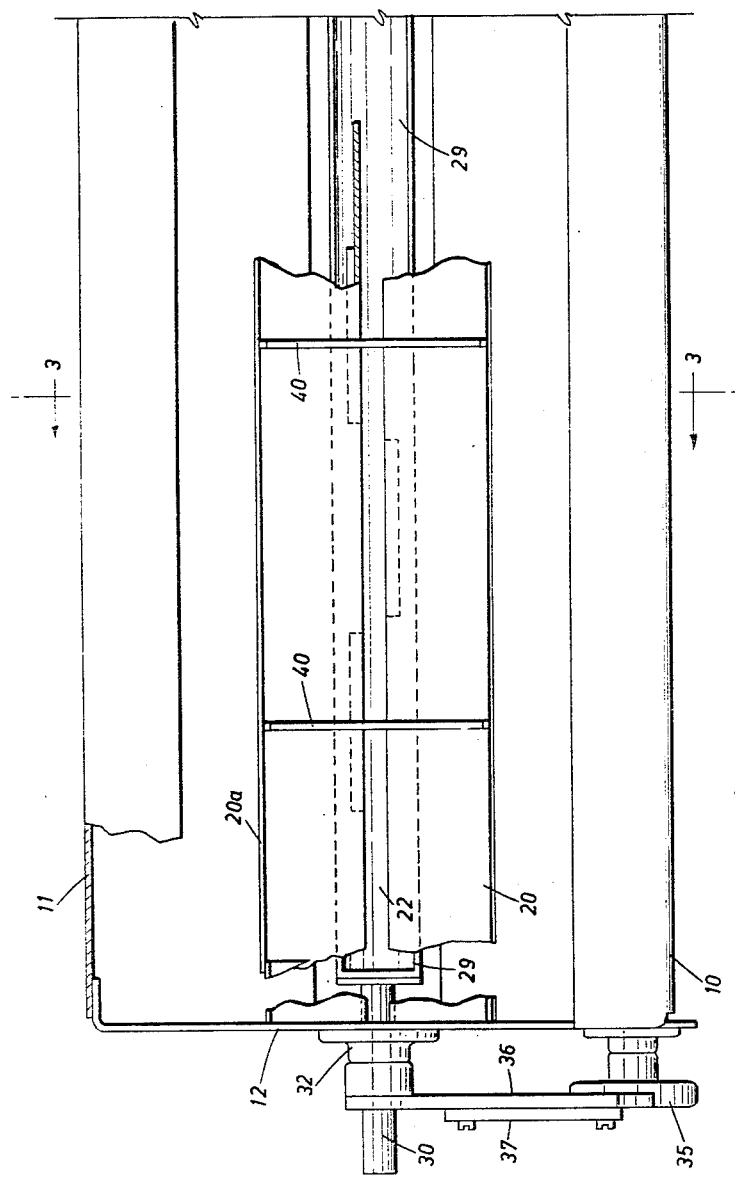
Figure 4 is a top plan view which illustrates the interior of the bin showing the hopper-shaped bottom.

The modification of the invention illustrated in Figures 6 and 7 includes a somewhat different design for the hopper-shaped base of the distributor bin and for the removable baffle component. In this modification each of the downwardly and inwardly sloping side walls of the bin is provided along its length with a recessed ledge, 47 and 47a, and the upper ends of the removable plates 50 and 50a are bent to form vertical supports 46 and 46a which rest on these recessed ledges. The ledges and supports are fashioned in such manner that each of the plates 50 and 50a conforms with and constitutes an extension of the corresponding sloping side wall of the bottom of the bin. Operation of the distributor device is the same as described above with reference to the removable baffle component illustrated in Figures 1 to 5, but the modification illustrated in Figures 6 and 7 provides improved rigidity of the assembly and more positive placement of the baffle component within the bin.

It will be understood, of course, that further modifications can be made in the preferred embodiment of the invention described herein without departing from the scope of the invention as defined by the appended claims.

What I claim as new and desire to protect by Letters Patent of the United States is:

1. In a device for distributing granular material which includes an elongated bin having a sloping, hopper-shaped bottom member and an open outlet in the base thereof which extends the length of the bin, the improvement which comprises the combination of an elongated, oscillatable, trough-shaped member which extends longitudinally below said open outlet and is adapted to receive and collect granular material from said bin, a removable baffle component adapted to seat on the sloping bottom of the bin and terminating in opposing, spaced, generally vertically disposed, rigid side walls which extend downwardly from said hopper-shaped bottom along the length of the open outlet thereof and terminate within said trough-shaped member adjacent to and above the inner surface thereof, said walls defining an open feed throat for the passage of granular material from the bottom of said bin to said trough-shaped member, end walls at each end of said feed throat, said end walls and side walls restricting to said feed throat the passage of material from said bin, said side walls forming within said trough-shaped member two opposed, rigid, spaced, scraper members each disposed along the length thereof, and means for oscillating said trough-shaped member whereby, during oscillation thereof, granular material is passed under the scraper members and granular material is discharged alternately over each edge of said oscillatable member.

2. In a device for distributing granular material which includes an elongated bin having a sloping, hopper-shaped bottom member and an open outlet in the base thereof which extends the length of the bin, the improvement which comprises the combination of an elongated, oscillatable, trough-shaped member which extends longitudinally below said open outlet and is adapted to receive and collect granular material from said bin, a removable baffle component adapted to seat on the sloping bottom of the bin and terminating in opposing, spaced, generally vertically disposed, rigid side walls which extend downwardly from said hopper-shaped bottom along the length of the open outlet thereof and terminate within said trough-shaped member adjacent to and above the inner surface thereof, said walls defining an open feed throat for the passage of granular material from the bottom of said bin to said trough-shaped member, end walls at each end of said feed throat, said end walls and side walls restricting to said feed throat the passage of material from said bin, said side walls forming within said trough-shaped member two opposed, rigid, spaced, scraper members each disposed along the length thereof, means for oscillating said trough-shaped member whereby, during oscillation thereof, granular material is passed under the scraper members and granular material is discharged alternately over each edge of said oscillatable member, and means for adjusting the angle of oscillation of the oscillatable trough-shaped member.

3. In a device for distributing granular material which includes an elongated bin having a hopper-shaped bottom member and an open outlet in the base thereof which extends the length of the bin, the improvement which comprises the combination of an elongated, oscillatable, trough-shaped member which extends longitudinally below said open outlet and is adapted to receive and collect granular material from said bin, two opposed, spaced, generally vertically disposed, rigid side walls which extend downwardly from said hopper-shaped bottom along the length of the open outlet thereof and terminate within said trough-shaped member adjacent to and above the inner surface thereof, said walls defining an open feed throat for the passage of granular material from the bottom of said bin to said trough-shaped member, end walls at each end of said feed throat, said end walls and side walls restricting to said feed throat the passage of material from said bin, said side walls forming within said trough-shaped member two opposed, rigid, spaced scraper members each disposed along the length thereof, the lower ends of said scraper members being flared outwardly, and means for oscillating said trough-shaped member whereby, during oscillation thereof, granular material is passed under the scraper members and granular material is discharged alternately over each edge of said oscillatable member.

4. In a device for distributing granular material which includes an elongated bin having a hopper-shaped bottom member and an open outlet in the base thereof which extends the length of the bin, the improvement which comprises the combination of an elongated, oscillatable, trough-shaped member which extends longitudinally below said open outlet and is adapted to receive and collect granular material from said bin, two opposed, spaced, generally vertically disposed, rigid side walls which extend downwardly from said hopper-shaped bottom along the length of the open outlet thereof and terminate within said trough-shaped member adjacent to and above the inner surface thereof, said walls defining an open feed throat for the passage of granular material from the bottom of said bin to said trough-shaped member, end walls at each end of said feed throat, said end walls and side walls restricting to said feed throat the passage of material from said bin, said side walls forming within said trough-shaped member two opposed, rigid, spaced, scraper members each disposed along the length thereof, the lower end of each scraper member being in the form of a series of spaced, outwardly flared projections, each projection being separated from the next adjacent flared projection by a slot to provide, along the length of each scraper member, alternate slots and projections with the centre of each slot opposite to the centre of a projection on the opposing scraper member, and means for oscillating said trough-shaped member whereby, during oscillation thereof, granular material is passed under the scraper members and granular material is discharged alternately over each edge of said oscillatable member.

5. In a device for distributing granular material which includes an elongated bin having a hopper-shaped bottom member and an open outlet in the base thereof which extends the length of the bin, the improvement which comprises the combination of an elongated, oscillatable, trough-shaped member which extends longitudinally below said open outlet and is adapted to receive and collect granular material from said bin, said oscillatable, trough-shaped member being substantially semi-circular in cross section and the sides thereof being extended upwardly a short distance above the longitudinal axis thereof, two opposed, spaced, generally vertically disposed, rigid side walls which extend downwardly from said hopper-shaped bottom along the length of the open outlet thereof and terminate within said trough-shaped member adjacent to and above the inner surface thereof, said walls defining an open feed throat for the passage of granular material from the bottom of said bin to said trough-shaped member, end walls at each end of said feed throat, said end walls and side walls restricting to said feed throat the passage of material from said bin, said side walls forming within said trough-shaped member two opposed, rigid, spaced, scraper members each disposed along the length thereof, and means for oscillating said trough-shaped member whereby, during oscillation thereof, granular material is passed under the scraper members and granular material is discharged alternately over each edge of said oscillatable member.

6. In a device for distributing granular material which includes an elongated bin having a hopper-shaped bottom and an open outlet in the base thereof which extends the length of the bin, the improvement which comprises a baffle component comprised of a pair of removable plates, each plate being adapted to seat on and mate with the sloping bottom of the bin and terminating in a vertically disposed extension which extends downwardly into said open outlet, the vertically disposed extensions being opposed to and spaced from each other thereby defining an open feed throat for passage of granular material from said bin, the lower end of each vertically disposed extension of said baffle component being divided along its length into alternately spaced slots and downwardly extending, outwardly flared projections with the centre of each slot being positioned opposite to the centre of an outwardly flared projection on the opposing, vertically disposed extension, an oscillatable trough-shaped member oscillatably mounted below said throat, said downwardly extending, outwardly flared projections terminating within said oscillatable through-shaped member, and means for oscillating said oscillatable member.

7. In a device for distributing granular material which includes an elongated bin having a hopper-shaped bottom and an open outlet in the base thereof which extends the length of the bin, the improvement which comprises a baffle component comprised of a pair of removable plates, each plate being adapted to seat on and mate with the sloping bottom of the bin and terminating in a vertically disposed extension which extends downwardly into said open outlet, said removable plates being connected and held rigid by means of vertically disposed, transverse webs secured to said removable plates, the vertically disposed extensions being opposed to and spaced from each other thereby defining an open feed throat for passage of granular material from said bin, the lower end of each vertically disposed extension of said baffle component being divided along its length into alternately spaced slots and downwardly extending, outwardly flared projections with the centre of each slot being positioned opposite to the centre of an outwardly flared projection on the opposing, vertically disposed extension, an oscillatable trough-shaped member oscillatably mounted below said throat, said downwardly extending, outwardly flared projections terminating within said oscillatable trough-shaped member, and means for oscillating said oscillatable member.

8. In a device for distributing granular material which includes an elongated bin having a hopper-shaped bottom which is defined by end walls and two opposed, downwardly and inwardly sloping side walls, and an open outlet extending the length of the bin between said sloping side walls, the improvement which comprises a recessed ledge along the lower part of each side wall, two removable plates, one of said plates corresponding to one of said sloping side walls and the other of said plates corresponding to the other sloping side wall, each plate fitting within the recessed ledge of its corresponding sloping side wall and extending from the recessed ledge downwardly and inwardly in the plane of the upper part of its corresponding side wall, the lower edge of each plate terminating in a vertically disposed extension which extends downwardly into said open outlet and which is spaced from the vertically disposed extension of the other plate thereby forming an open feed throat which extends the length of the bin for passage of granular material from said bin, vertically disposed means for fastening said plates to each other, an oscillatable trough-shaped member mounted below said open feed throat, and means for oscillating said oscillatable member.

References Cited in the file of this patent
UNITED STATES PATENTS

| | | |
|---|---|---|
| 173,380 | Wight et al. | Feb. 8, 1876 |
| 535,260 | McPherson | Mar. 5, 1895 |
| 739,228 | Schutz | Sept. 15, 1903 |
| 2,620,946 | Auer | Dec. 9, 1952 |